US007471317B2

(12) United States Patent
Seki (10) Patent No.: US 7,471,317 B2
(45) Date of Patent: Dec. 30, 2008

(54) DIGITAL CAMERA APPARATUS

(75) Inventor: Kazuyuki Seki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 774 days.

(21) Appl. No.: 10/802,912

(22) Filed: Mar. 18, 2004

(65) Prior Publication Data

US 2004/0257449 A1 Dec. 23, 2004

(30) Foreign Application Priority Data

Mar. 19, 2003 (JP) ............................. 2003-076456

(51) Int. Cl.
H04N 9/73 (2006.01)
(52) U.S. Cl. .................................. 348/231.3
(58) Field of Classification Search ............... 348/231.3
See application file for complete search history.

(56) References Cited

U.S. PATENT DOCUMENTS

| 5,546,145 | A * | 8/1996 | Bernardi et al. ............. 396/312 |
| 6,611,803 | B1 * | 8/2003 | Furuyama et al. ........... 704/254 |
| 2001/0048774 | A1 * | 12/2001 | Seki et al. .................... 382/305 |
| 2003/0147563 | A1 * | 8/2003 | Liu et al. ..................... 382/276 |
| 2004/0096114 | A1 * | 5/2004 | Tomita et al. ................ 382/239 |
| 2004/0201688 | A1 * | 10/2004 | Wolf et al. ................... 348/207.1 |
| 2005/0036373 | A1 * | 2/2005 | Aono et al. .................. 365/202 |
| 2006/0036864 | A1 * | 2/2006 | Parulski et al. .............. 713/176 |

FOREIGN PATENT DOCUMENTS

| JP | 2000-078530 | 3/2000 |
| JP | 2003-069925 | 3/2003 |
| JP | 2003-069925 A * | 3/2003 |

OTHER PUBLICATIONS

English Machine translation of JP-2003-69925 A Mar. 2003 Hara Masashi.*
"Manual of Digital Camera RDC-i700 manufactured by Ricoh", 10 pgs. (Cited in the Specification).

* cited by examiner

Primary Examiner—James M Hannett
(74) Attorney, Agent, or Firm—Oblon, Spivak, McClelland, Maier & Neustadt, P.C.

(57) ABSTRACT

A digital camera apparatus is disclosed, which includes a recorder for recording a plurality of informative data of items, as an information file, to be used in classifying and arranging image data, a microphone for inputting voices, a voice decipher for deciphering a content of expression made by the voices picked up through the microphone, an item informative data extractor for extracting an informative datum of an item which informative datum is analogous to the deciphered content of the expression from the information file, and an item informative data recorder for recording the informative datum of the item extracted by the extractor into an Exif file for the image data.

15 Claims, 9 Drawing Sheets

//CAMERA MEMORANDUMX DATA LIST

//START gate entrance washing room toilet bathroom kitchen living room

Japanese-style room bed room child room deck

//END

FIG. 5

USER COMMENT TAG

GCM-TAG (NULL)

CAMERAMEMO-TEXT1 (NULL)   CAMERAMEMO-TEXT2 (NULL)

CAMERAMEMO-TEXT3 (NULL)   CAMERAMEMO-TEXT4 (NULL)

CAMERAMEMO-TEXT5 (NULL)   (NULL)

PROVIDED (NULL) MEANS 00H

DIGITAL CAMERA APPARATUS

BACKGROUND OF THE INVENTION (1) Field of the Invention

The present invention relates to a digital camera apparatus. More specifically, the invention relates to a digital camera apparatus which can register informative data to be used for classification and arrangement of image data into an Exif file of the image data.

(2) Related Art Statement

The digital camera can record many images (image data) in a single recording medium (for example, a smart media a compact flash (both being registered trademarks). Since an unnecessary image can be instantly deleted in the digital camera, a greater number of images are often photographed as compared with conventional silver film cameras.

However, as the number of photographed images increases, it becomes more troublesome to classify and arrange them. Thus, a method, which facilitates the arrangement of the images, has been demanded. As such a method, for example, there is proposed a method in which image date are associated with informative data of items such as text data or voice data, and the images are automatically classified and arranged based on the associated informative data of the item.

In order to associate the informative data of the items with the images, there is a proposed method in which a list of such informative data of the items are prepared in a PC and taken into a digital camera, and a specific informative datum of the item is selected from a list of the informative data of the item on photographing and associated with a photographed image (For example, Japanese Patent Application No. 2002-265011, not laid opened to the public, and Manual of Digital Camera RDC-i700 manufactured by Ricoh). Another method is proposed for associating an informative datum of an item with an image by displaying a software keyboard on a liquid crystal monitor of the digital camera, preparing such an informative datum of the item by inputting with a key through touching and taking the prepared informative datum into an Exif file on photographing.

Since inputting on the software keyboard is troublesome, another method is examined, in which informative data of items containing fixed wordings are registered in an external memory or a built-in memory in advance and a given informative datum is selected therefrom by operating a touch panel or operating with key. See Japanese Patent Application No.2002-205611 (not laid opened to the public.).

However, since it is troublesome to associate a photographed image with the informative datum of the item on photographing in case of the conventional digital camera when photographing is effected outside, improvement on operability has been demanded. Thus, a method is desired in which key-inputting operations are further decreased to more simply associate the informative data of the items with the image data.

SUMMARY OF THE INVENTION

The present invention has been accomplished in view of the above problems, and is aimed at providing a digital camera apparatus which can easily take into an Exif file informative data of items to be associated with images.

In order to accomplished the above object, the digital camera apparatus according to the present invention comprises a recorder for recording a plurality of informative data of items, as an information file, to be used in classifying and arranging image data, a microphone for inputting voices, a voice decipher for deciphering a content of expression made by said voices picked up through the microphone, an item informative data extractor for extracting an informative datum of an item which informative datum is analogous to the deciphered content of the expression from the information file, and an item informative data recorder for recording the informative datum of the item extracted by the extractor into an Exif file for the image data.

According to the present invention, since the informative datum of the item can be extracted based on the inputted voice and recorded into the Exif file, operation of inputting with keys can be reduced, so that the informative data of the item can be associated with the image data by simpler operations.

Further, since the informative data of the item extracted as being suitable for classification and arrangement can be assuredly registered in the Exif file, the image data can be more effectively classified and arranged.

When the informative datum of the item is definitely determined by triggering release on photographing, it is possible to decide the informative datum of the item to be associated with the image data, while ensuring an intended object on photographing.

BRIEF DESCRIPTION OF THE ATTACHED DRAWINGS

For a better understanding of the invention, reference is made to the attached drawings, wherein.

DETAILED DESCRIPTION OF THE INVENTION

In the following, the digital camera apparatus according to the present invention will be explained with reference to the drawings.

Figure 1:
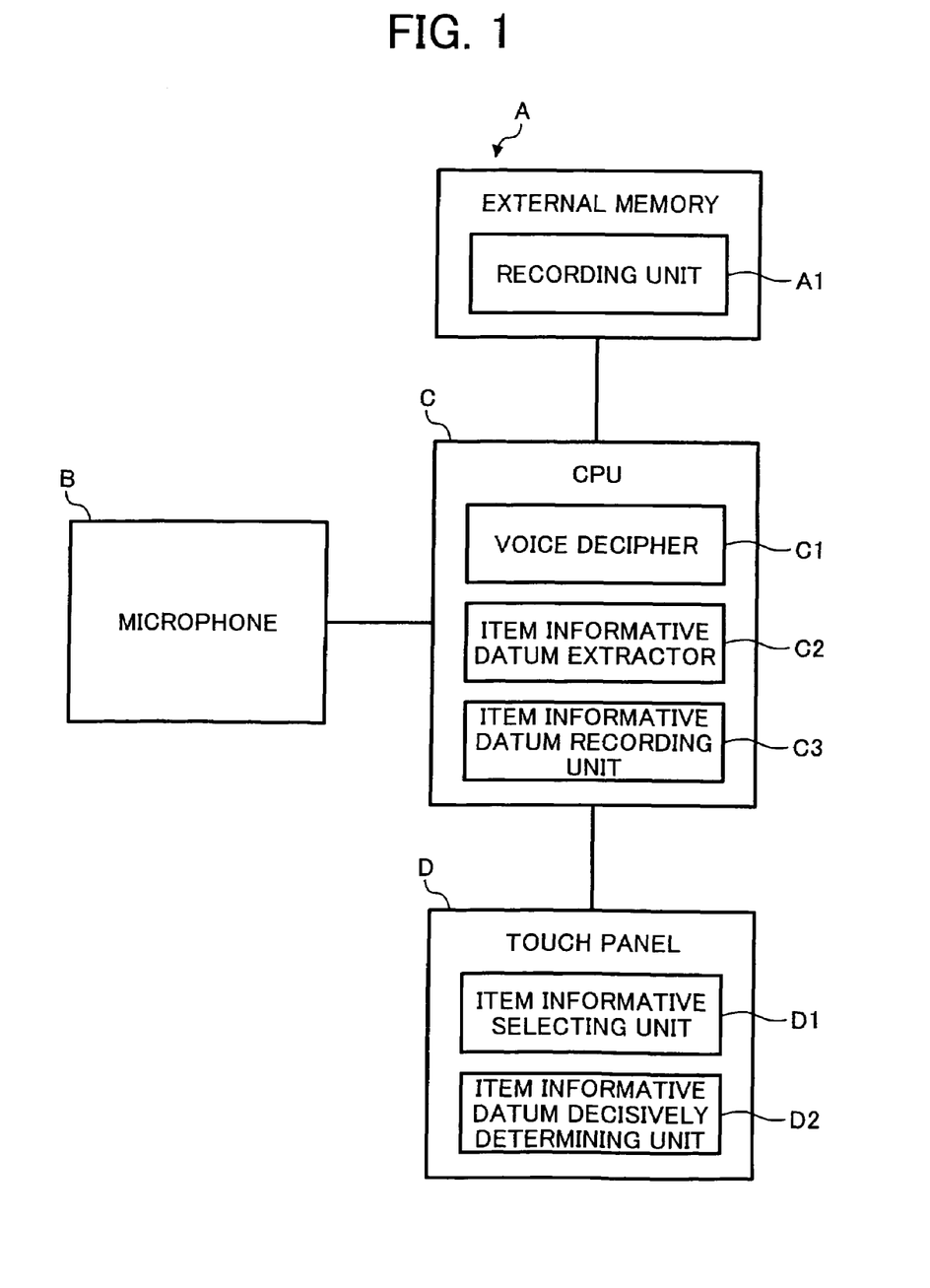
FIG. 1 is a concept view of the digital camera apparatus according to the present invention.

FIG. 1 is a concept view of the digital camera apparatus according to the present invention. The digital camera apparatus comprises a recording unit (an external memory) A, a microphone B, and a CPU C. The digital camera apparatus may further comprise a touch panel D. The CPU C comprises or function as a voice decipher C1, an item informative datum extractor C2 and an item informative data recording unit C3. The touch panel D comprises or functions as an item informative datum selecting unit D1 and an item informative datum decisively determining device D2. The touch panel D functions as a inputting unit for ordering operations. The recorder A is adapted for recording a plurality of informative data of items, as an information file, to be used in classifying and arranging image data. The microphone B is adapted for inputting voices, and the voice decipher C1 is adapted for deciphering a content of expression made by said voices picked up through the microphone. The item informative data extractor C2 is adapted for extracting an informative datum of an item which informative datum is analogous to the deciphered content of the expression from the information file by comparing the deciphered content of the expression with informative data stored as an information file in a built-in memory of the CPU or an external memory. The item informative data recorder A1 is also adapted for recording the informative datum of the item extracted by the extractor into an Exif file for the image data.

The item informative data selecting unit D1 is adapted to select a informative datum of the item from a plurality of the analogous information data of the item, said information datum of the item being to be decisively determined by the below-mentioned item informative datum decisively determining unit, when the item informative extractor extracts said plurality of analogous informative data of the item, the item informative datum The item informative datum decisively determining unit D2 is adapted for fixedly determining the information datum of the item extracted by the extractor. In this case, the item information data recorder records the informative datum of the item decisively determined by the item information datum fixedly determining unit into said Exif file.

According to the present invention, the digital camera apparatus comprising a recorder for recording a plurality of informative data of items, as an information file, to be used in classifying and arranging image data, a microphone for inputting voices, a CPU and an inputting unit for ordering operations, wherein based on instructions from said inputting unit, said CPU is constructed to decipher a content of expression made by said voices picked up through the microphone, to extract an informative datum of an item which informative datum is analogous to the deciphered content of the expression from the information file, and to record the informative datum of the item extracted by the extractor into an Exif file for the image data. The CPU may be provided with a program to effect the above operations of the CPU.

In the following, more specific embodiments of the digital camera apparatus according to the present invention will be explained with reference to FIG. 2 to FIG. 11.

Figure 2:
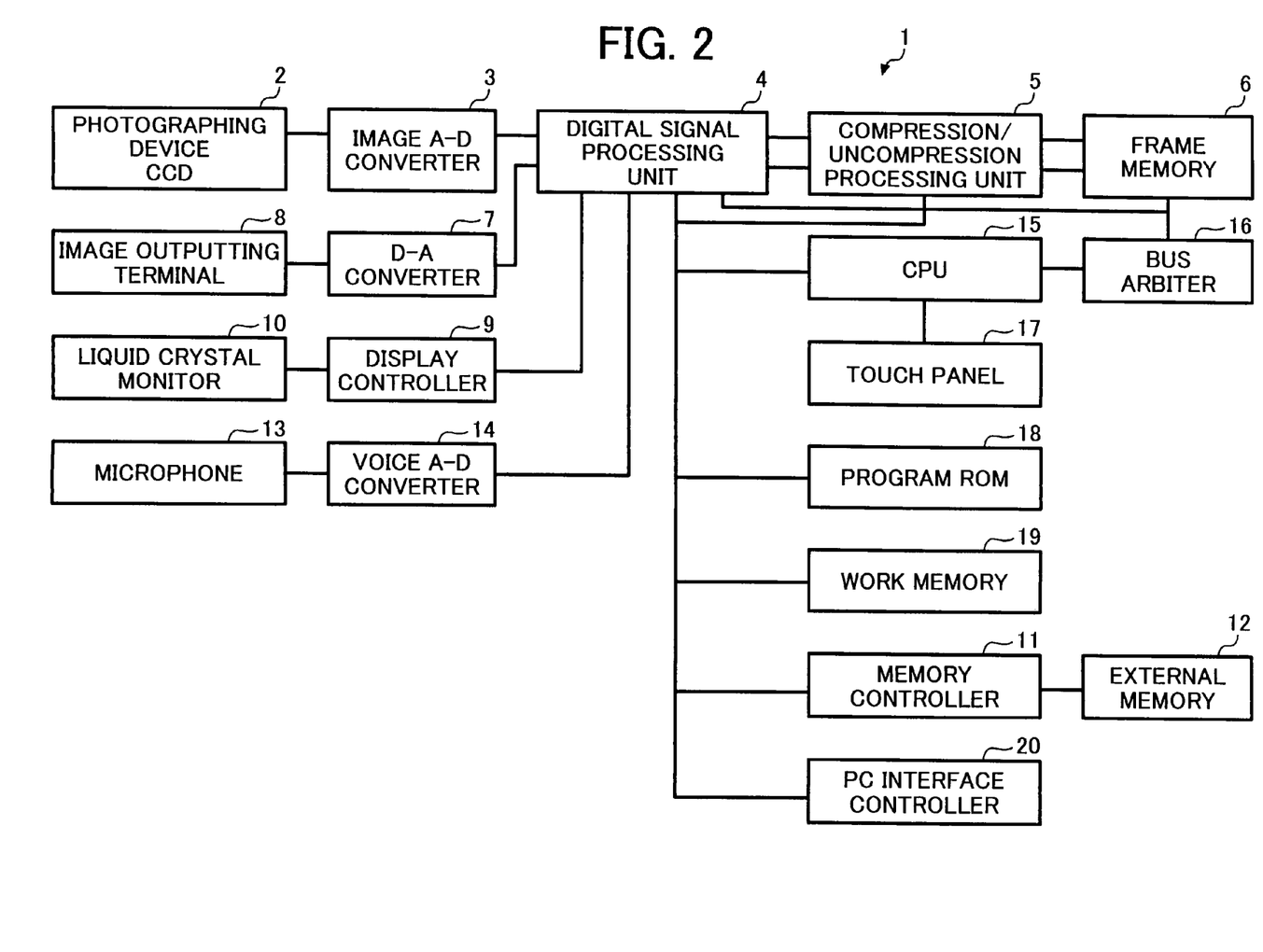
FIG. 2 is a block diagram showing the construction of one embodiment of the digital camera according to the present invention.

FIG. 2 is a block diagram showing the fundamental construction of one embodiment of the digital camera 1 according to the present invention. The digital camera 1 includes a photographing device (CCD) 2, an image A-D converter 3, a digital signal processing unit 4, a compressing/decompressing unit 5, a frame memory 6, an image D-A converter 7, an image output terminal 8, a display controller 9, a liquid crystal monitor 10, a memory controller 11, and an external memory 12.

When photographing is started with the digital camera 1, the inputted image is converted to electric signals with the photographing device 2, they are converted to digital signals at 8 bits (256 gradation sequences) to 12 bits (4096 gradation sequences) with the image A-D converter, and the digital signals are outputted to the digital signal processing unit 4.

In the digital signal processing unit 4, photometry calculations necessary for auto focusing (AF), automatic exposure control (AE), auto white balance (AWB), etc. are performed, and signal processing of brightness and color is effected to enhance resolutions and color reproductivity.

In the compressing/decompressing unit 5, image data, which are subjected to signal processing in the digital signal processing unit 4, are compressed in a necessary data format by using the frame memory 6. Coded and compressed image data are recorded in the external memory (external memorizing unit) 12 via the memory control unit 11.

When the image data recorded in the external memory 12 are to be reproduced, the compressing/decompressing unit 5 decompresses the image data by using the frame memory 6, and the digital signal processing unit 4 converts the image data into raster data. The image data subjected to signal processing in the digital signal processing unit 4 are converted into analog data with the image D-A converter 7, and outputted to the imaging output terminal 8, while images are displayed on the liquid crystal monitor 10 via the display controller 9.

Further, the digital camera 1 according to the present invention further comprises a microphone 13, a voice A-D converter 14, a CPU 15, a bath arbiter 16, a touch panel 17, a program ROM 18, a work memory 19, and a PC interface controller 20.

Voices inputted through the microphone 13 are converted to digital signals with the voice A-D converter 12 at sampling rate of 8-16 KHz/16 bits, and the digital signals are outputted to the digital signal processing unit 4. In case of ordinary recording, the converted digital signals of the voice are recorded in the external memory 12 via the digital signal processing unit 4 and the compressing/decompressing unit 5. The data are compressed or uncompressed in a data format necessary for reproduction with a loudspeaker not illustrated. When voice recognition is performed as mentioned later, the voice data are developed in the work memory 19. The CPU 15 analyzes the voice data (contents of expression) developed in the work memory 19, compares them with data contents (informative data of items : data of fixed sentences) recorded in the information file preliminarily stored in the external memory 12 or the built-in memory, and successively outputs the informative data of the item in the order of being nearer to the contents of the voice data (contents of expression) on the liquid crystal memory 10. A user decides a specific informative datum of the item from among the informative data of the item displayed on the liquid crystal monitor 10 through selecting by releasing, by key operation with a cross key not illustrated or by voice. The decided informative data of the item in the information data are recorded in the Exif file which is prepared on photographing. This Exif file will mentioned later.

The CPU 15 performs data transmission between the external memory 12, selection of the informative data of the item in the information file, and recording of the informative data of the item in the Exif file according to the processing program recorded in the program ROM 18.

The PC interface control unit 20 is to be used when data communications are effected between a PC by using an USB (Universal Serial Bus) cable. The bus arbiter 16, when there exist plural masters in the bus, effects adjustment to allocate a use right to respective masters.

In the digital camera 1, the file system format to be used in memorizing the image data in the external memory 12 is constructed according to the DCF (Design rule for Camera File system). The DCF is a standard of the file system of the digital still cameras, which was specified by Japan electronic industrial Developing Association (Electronic Association) on January, 1999.

The information file recorded in the external memory 12 is defined and recorded in a TEMPLATE folder which is in the same layer as the DCIM directory in which the image data are recorded. The information files are recorded in the respectively different file names depending upon their kinds. In the information file, data of the information item expressed in "Katakana" are recorded so that the voice data may be compared with the information item by calculation when the CPU 15 performs the voice recognition.

Figure 3:
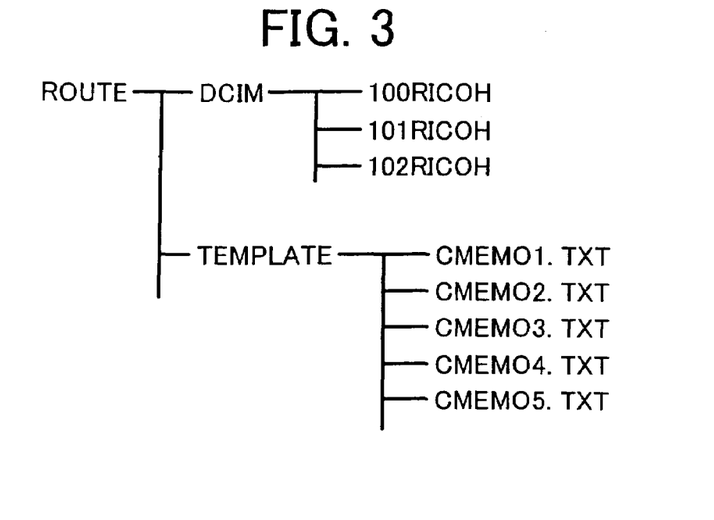
FIG. 3 is a figure illustrating a format of a file system recorded in an external memory of the digital camera according to the present invention by way of example.

FIG. 3 illustrates a file system to be recorded in the external memory 12 by way of example. In FIG. 3 are shown three data-storing folders (100 RICOH~102 RICOH)provided in the DCIM folder and five information files (CMEMO 1.TXT~CMEMO 5.TXT) to be recorded in the TEMPLATE folder.

A recording file (image data, voice data, motion picture data, etc.) as a DCF object is stored in a folder of the DCIM directory such as 100 RICOH, for example. The recording file contains data prepared according to the Exif format. The Exif is a format standard for image files of the digital still camera, and this format standard was set up in October 1995 by Japanese electronic Industrial Developing Association (Electronic Association). In the recording file of the Exif format, there are specified areas for main images and thumbnail-sized image, respectively.

Figure 4:
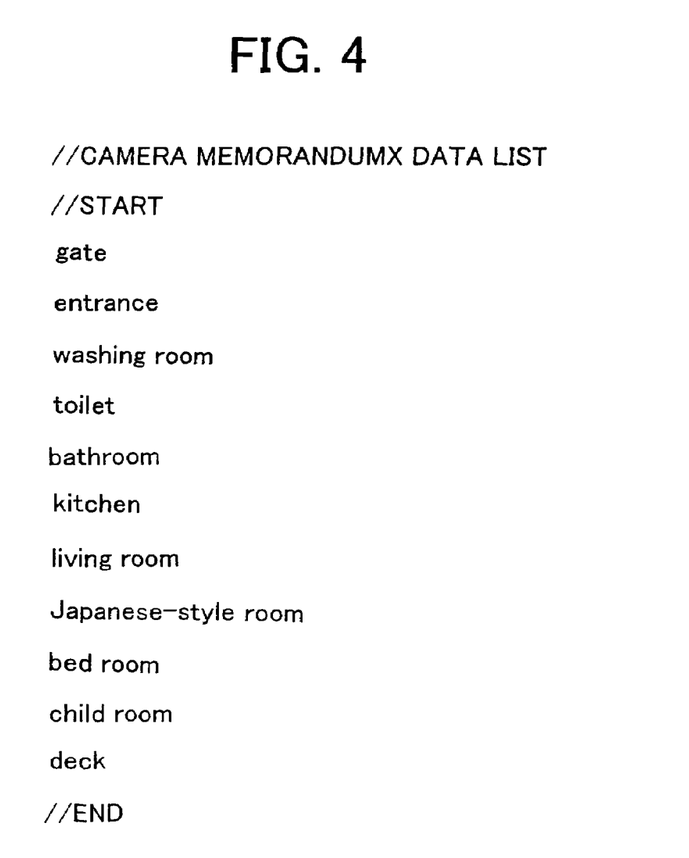
FIG. 4 is a figure showing the content of an information file by way of example.

The information file is recorded in the TEMPLATE folder in a file name of CMEMOx.TXT in which different figures or alphabets are given to "x" portions depending upon the kinds of the information files (names of items). FIG. 4 shows the contents of CMEMO4.TXT. Since "//" portion is utilized as a commenting line but is not recognized as data, the actual informative data of the item are contents recited between //start and //End. The contents shown on the left side in FIG. 4 are informative data of the items displayed on the liquid crystal monitor 10, whereas the contents expressed in "Katakana" on the right side are data which each give a way of reading to which the CPU 15 refers in performing comparison by calculation on voice recognition.

Figure 5:
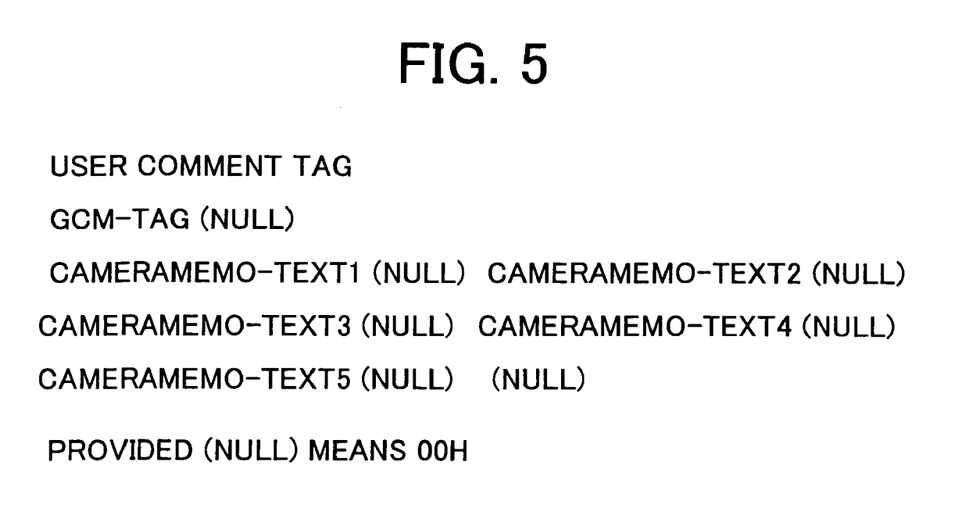
FIG. 5 is a figure showing a make-up of an Exif file by way of example.

FIG. 5 is one example of the Exif file in which data regarding the informative data of the item selected from among the information files are recorded. Informative data of the item selected in User Comment Tag of the Exif file are recorded.

Next, with reference to flow charts shown in FIGS. 5 and 8 to 11, a process for selecting a specific informative datum of the item from the information file on photographing with the digital camera 1 constructed above and recording the selected informative datum in the Exif file will be explained.

Figure 6:
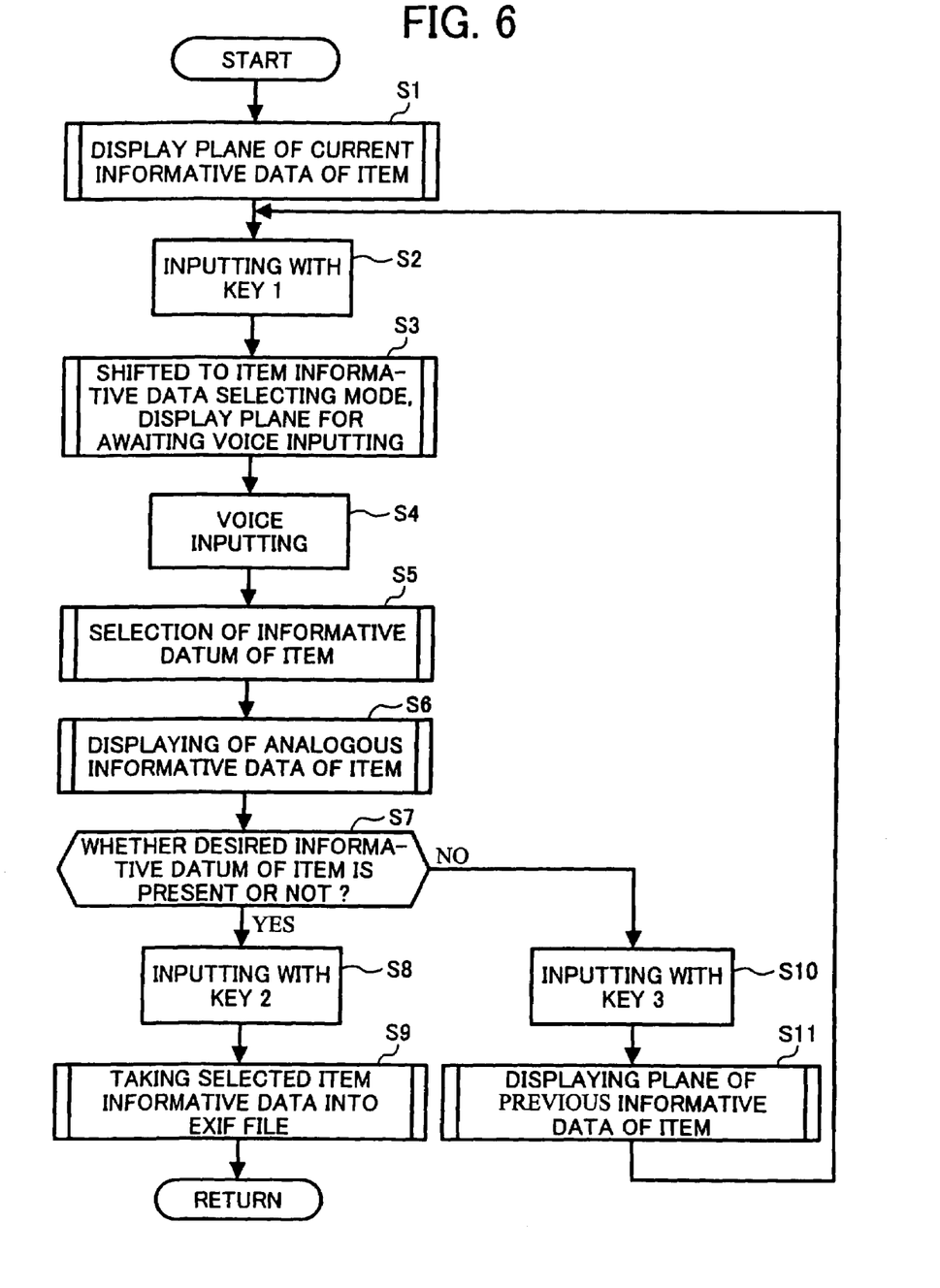
FIG. 6 is a first flow chart illustrating an Exif file-recording process according to the digital camera of the present invention.

When the digital camera 1 is in an operating state and a set mode is a photographing mode, as shown in Step S1 of FIG. 6, the CPU 15 displays on the liquid crystal monitor 10 an image being monitored by the photographing device 2, and also displays kinds of information data (names of items) and informative data of the items settable for the respective kinds of the information data, while overlapping them with the image.

Figure 7:
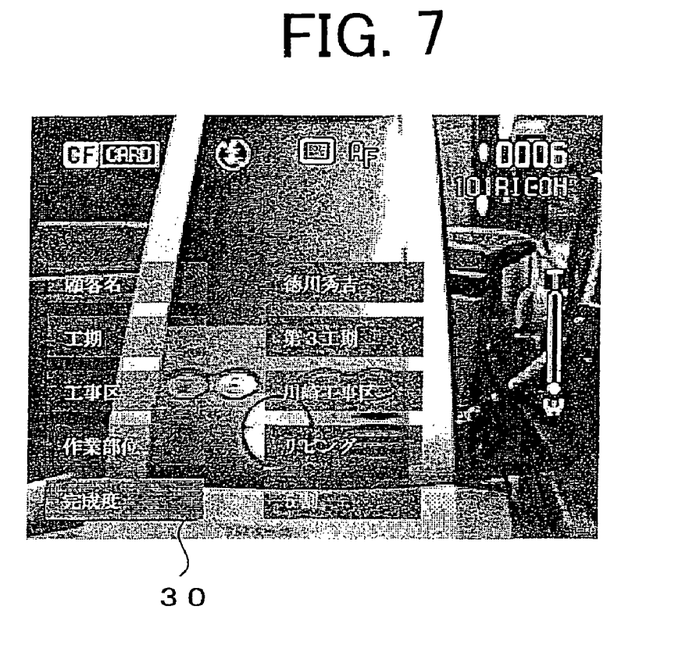
FIG. 7 is a figure showing a display plane of a liquid crystal monitor in which the name of an item of the information file is displayed with a cursor.

FIG. 7 shows a display plane on the liquid crystal monitor 10 in Step S1. On the left side of the liquid crystal monitor 10, the kinds of the information files (the names of the items) consisting of "顧客名" (name of customer), "工期" (construction period), "工事区" (construction area), "作業部位" (site to be worked) and "完成度" (degree of completeness) are displayed, and the informative data of the items are displayed on the right side of the kinds of the information file (the names of the items) according to these kinds of the information files.

The informative data of the item corresponding to "顧客名" (name of customer) are in the above-mentioned CMEMO1.TXT file, and those corresponding to "工期" (construction period) are in CMEMO2.TXT file. The informative data corresponding to "工事区"(construction area) are in the CMEMO3. TXT file, and those corresponding to "作業部位" (site to be worked) and "完成度" (degree of completeness) are in CMEMO4.TXT file and CMEMO5.TEXT file, respectively. In FIG. 7, the kind "30" for "完成度" (degree of completeness) in the information data is displayed by cursor.

When the user performs a specific key operation (inputted with key 1) in Step S2, as shown in Step S3, the processing in the digital camera is shifted to an information selecting mode in which informative data of the items to be recorded in the Exit file are selected for respective kinds of the information files. After shifting the digital camera to the information selecting mode, the user can select the kind of the information file (name of item) by shifting the indication with the cursor through key operation, and can select the informative data of the item for every kind of the information data by inputting voice. In FIG. 7, etc., informative data in Japanese: "徳川家康", "第３工期", "|崎工事区", "リビング", "5割" mean "Ieyasu Tokugawa", "Third construction period", "Kawasaki construction area", "living " and "50% ",respectively.

Figure 8:
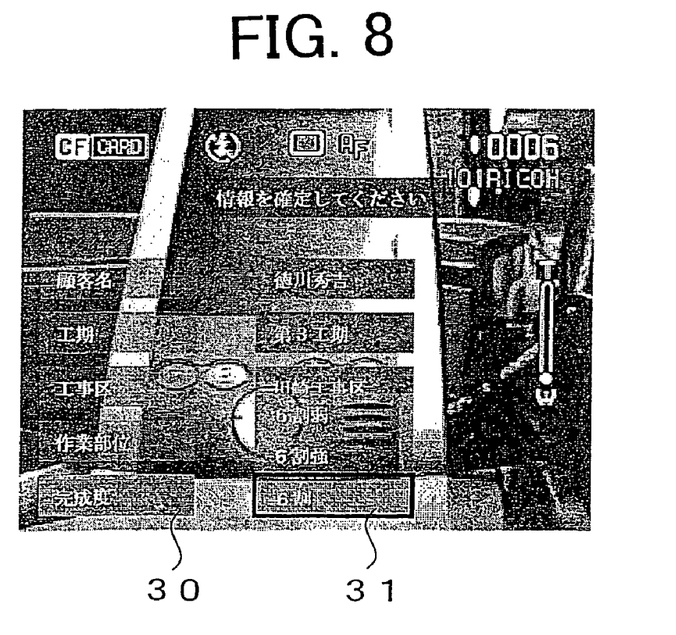
FIG. 8 is a figure showing a display plane of a liquid crystal monitor in which an informative datum of the item of the information file is displayed with the cursor.

When the user inputs the voice as shown in Step S4, the CPU 15 analyzes the voice input as shown in Step S5, selects an analogous information datum of the item by comparing the informative data of the item of the key-specified kind (name of item) with the voice data, and displaying the informative data of the item having high similarity on the liquid crystal monitor 10 as shown by Step S6. FIG. 8 shows a display of the image in which informative data 31 of the item: "6 割弱(less than 60%)", "6 割強(more than 60%)" and "6 割(60%)" of the kind of "degree of completeness" 30 can be selected.

Thereafter, as shown in Step S7, it is judged based on inputting with the key whether a desired informative datum of the item is present or not in the informative data of the item displayed on the liquid crystal monitor 10. If it is judged by user' inputting with a key that there is the desired informative datum of the item (if Key 2 is inputted in Step S8), the informative datum of the item is definitely determined by this key inputting, and as shown in Step S9, the determined informative datum of the item is registered in the Exif file and the processing of the digital camera 1 is returned to the photographing mode. If the CPU 15 judges that no desired informative datum of the item exists (If inputting is done with Key 3 in Step S10), as shown in Step S11, the informative data registered for the kind of the information data before the voice is inputted is displayed on the liquid crystal monitor 10, and the processing shown in S 2 is performed again after the processing of the digital camera 1 is returned to the photographing mode.

When the above processing is performed in the digital camera 1 on photographing images, the desired informative data of the item can be easily recorded in the Exif file according to the informative data of the item in the information data recorded in the TEMPLATE folder of the external memory 12. Therefore, the image data can be easily classified and arranged based on the contents of the Exif file after photographing. Further, since the informative data of the item can be selected by the voice recognition, the buttoning operations can be reduced. Furthermore, since the informative data of the item having high analogue can be selected by the voice recognition, various contents of the informative data can be easily associated with the image data by simple operations.

The process for selecting the informative data of the item from the information file and recording them in the Exif file is not limited to the above-mentioned one. For example, as shown in FIG. 9, for example, it may be that processing of the digital camera 1 is shifted to an information selecting mode by pushing down a release button (first release button-push-down) (Step S2A) instead of inputting with Key 1 in the processing of Step S2 shown in FIG. 6; when the release button is pushed down again (second release button-push-down) (Step S8A) instead of inputting with Key 2 in the processing of Step S8 of FIG. 6, processing shown in Step S9 is performed; and when the release button is released (release button-releasing) (Step S10A) instead of inputting with Key 3 in Step S10 of FIG. 6, the processing shown in Step S10 is performed.

When the processing of the digital camera 1 is switched by the release button-pushing down/release button-releasing, operability can be enhanced with no need of providing a plurality of Keys. When operation with the release button is to be done, the informative data of the item can be easily selected and determined while the object to be photographed is being confirmed.

Figure 9:
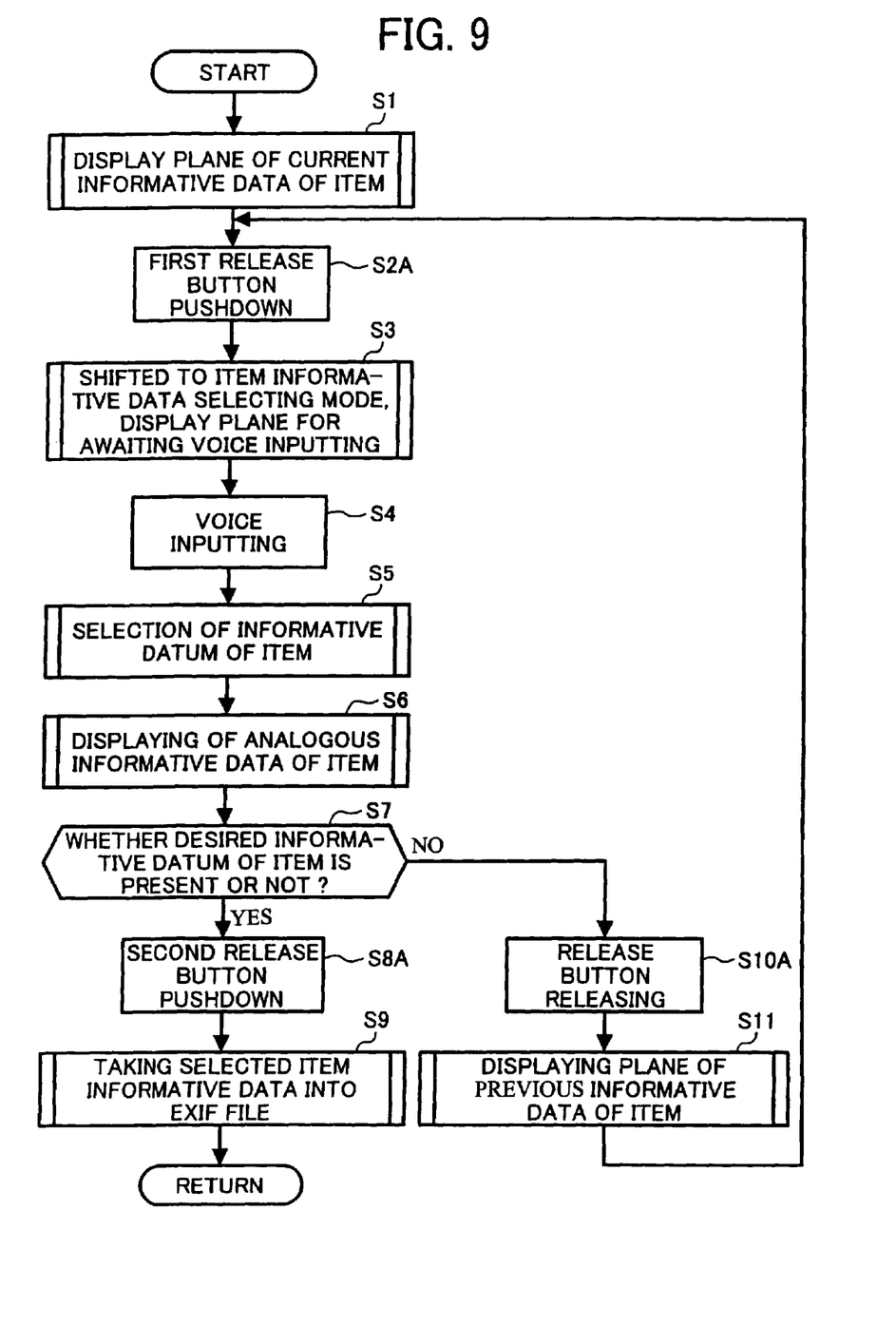
FIG. 9 is a second flow chart illustrating an Exif file-recording process according to the digital camera of the present invention.
Figure 10:
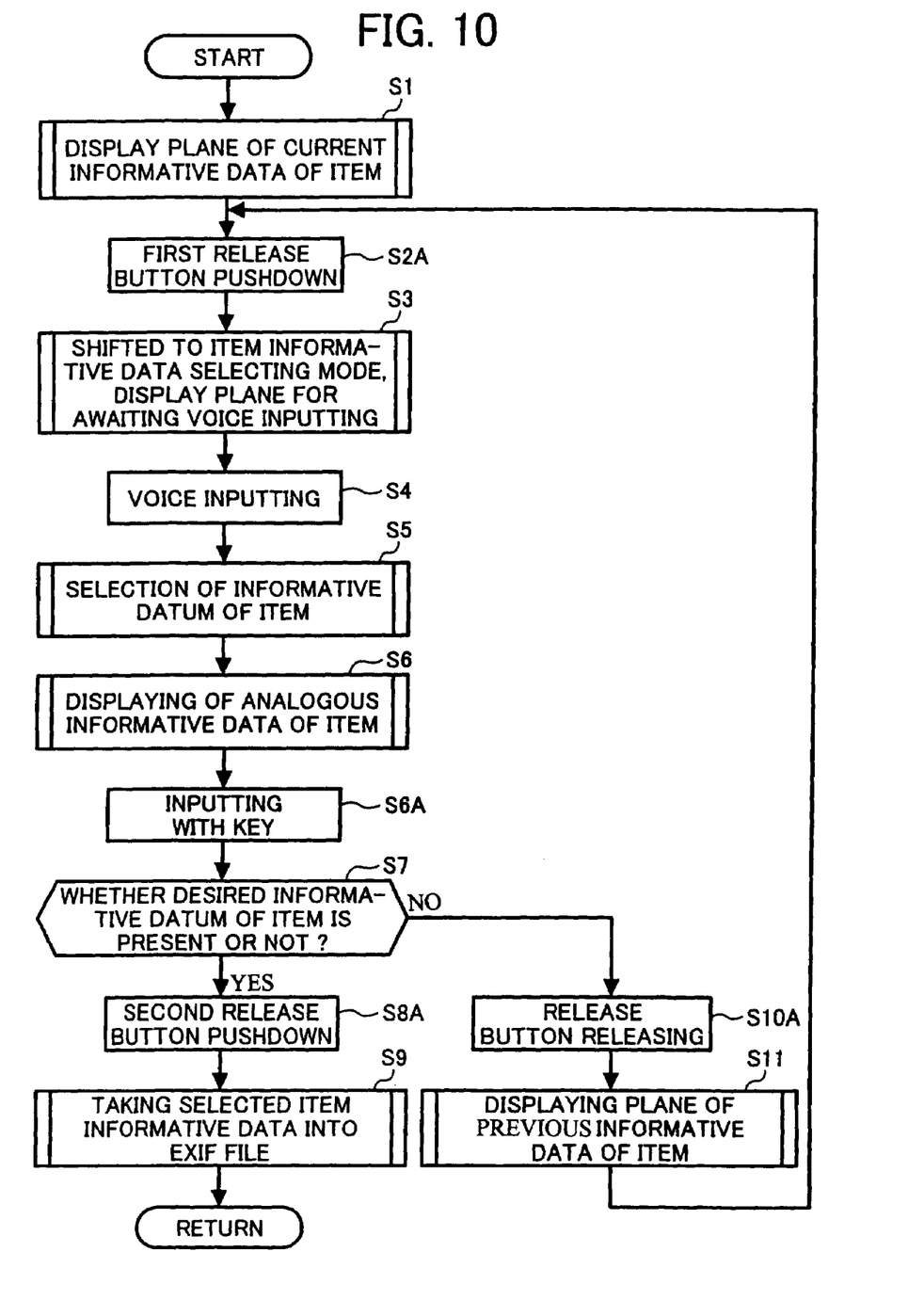
FIG. 10 is a third flow chart illustrating an Exif file-recording process according to the digital camera of the present invention.

Moreover, as shown in FIG. 10, processing of allowing key inputting may be performed (Step S6A) as a post processing of Step S6 shown in the flow chart of FIG. 9 in order that the user may select a desired informative data of the item in the information data by vertically selecting the informative data with use of a cross key or the like, while pushing down the release button. When such processing is added, displaying with cursor is moved by operating the vertical keys in the state that the release button is being pushed down, so that any informative datum of the item can be determined from among the informative data of the item displayed as candidates. Thus, the desired informative datum of the item can be easily selected from plural analogous informative data of the item.

Figure 11:
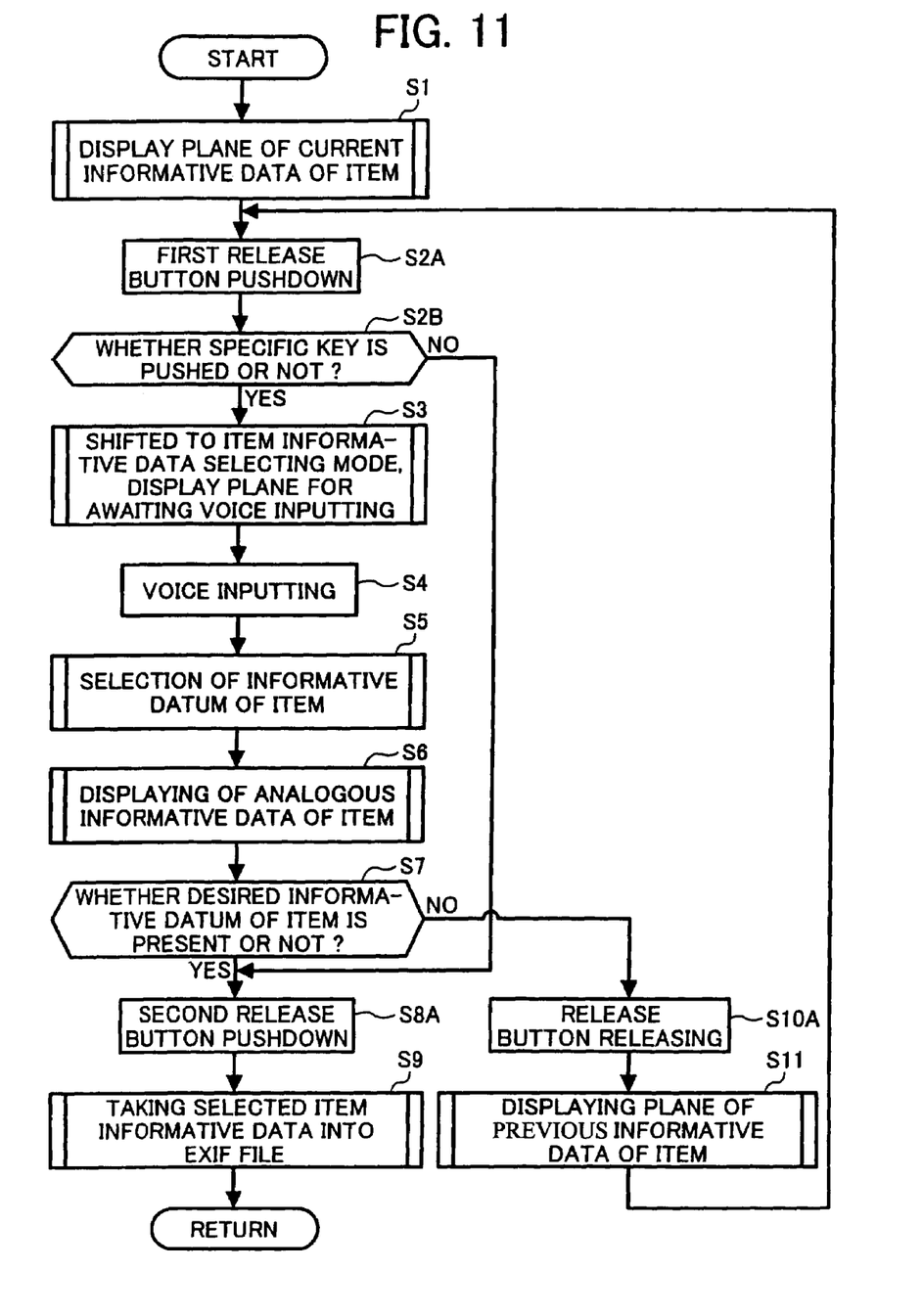
FIG. 11 is a fourth flow chart illustrating an Exif file-recording process according to the digital camera of the present invention.

As shown in FIG. 11, a judging processing (Step S2B) is added as a post processing step of Step S2 shown in the flow chart of FIG. 9 to judge whether a specific key is pushed by the user. In this case, it may be that when the specific key is pushed, each processing in the information-selecting mode shown in Step S3 to Step S7 is performed, whereas when no specific key is pushed, the processing is shifted to one shown in Step S8A. When processing is performed in this manner, processing with voice inputting is not performed unless the specified key is pushed. Consequently, in case that photographing is performed at plural times by using the informative data of the item in the information file already set, it is possible to avoid the possibility that the informative data of the item in the information data is unintentionally changed by voice recognition. In addition, since the informative data of the item can be selected through the voice inputting on pushing down the specific key, the selection processing can be easily and accurately performed by the voice recognition.

In the above, although the digital camera apparatus has been explained with reference to the illustrated digital camera 1, the invention digital camera apparatus is not limited to the construction of the digital camera mentioned above. The digital camera apparatus according to the present invention may be not only the digital camera, but also a PDA (Personal Digital Assistant) having a digital camera function, a palm top PC having a digital camera function, a note type PC having a digital camera function, a telephone machine having a digital camera function, etc., for example.

What is claimed is:

1. A digital camera apparatus, comprising:
    a recorder which records a plurality of informative data of items, as an information file, to be used in classifying and arranging image data;
    a microphone which inputs voices;
    a voice decipher which deciphers a content of expression made by said voices picked up through the microphone;
    an item informative data extractor which extracts at least one of the plurality of the informative data of the items, analogous to the deciphered content of the expression, from the information file;
    an item informative data recorder which associates the at least one of the plurality of the informative data of the items extracted by the extractor with the image data, and which records the associated at least one of the plurality of the informative data of the items;
    an item informative datum decisively determining unit which fixedly determines the at least one of the plurality of the informative data of the items extracted by the extractor; and
    an item informative data selecting unit,
    wherein said item information data recorder records the at least one of the plurality of the informative data of the items decisively determined by the item information datum fixedly determining unit, and
    wherein when said item informative data extractor extracts the plurality of the informative data of the items, the item informative datum selecting unit selects one of the plurality of the informative data of the items to be decisively determined by the item informative datum decisively determining unit.

2. The digital camera apparatus set forth in claim 1, wherein said item informative datum selecting unit selects one of the plurality of the informative data of the items based on the content of the expression of the voices deciphered by said voice decipher.

3. The digital camera apparatus set forth in claim 2, further comprising a voice inputting controller which effects on/off control of inputting of the voices with said microphone, and said voice inputting controller controls said on/off control of the inputting of the voices in conjunction with turning on/off operation of a specific key.

4. The digital camera apparatus set forth in claim 1, wherein said item informative datum selecting unit selects one of the plurality of the informative data of the items based on the content of the expression of the voices deciphered by said voice decipher.

5. The digital camera apparatus set forth in claim 4, further comprising a voice inputting controller which effects on/off control of inputting of the voices with said microphone, and said voice inputting controller controls said on/off control of the inputting of the voices in conjunction with turning on/off operation of a specific key.

6. The digital camera apparatus set forth in claim 1, further comprising a voice inputting controller which effects on/off control of inputting of the voices with said microphone, and said voice inputting controller controls said on/off control of the inputting of the voices in conjunction with turning on/off operation of a specific key.

7. The digital camera apparatus according to claim 1, wherein the item informative data recorder records the at least one of the plurality of the informative data of the items into an Exif file for the image data.

8. A digital camera apparatus, comprising:
a recorder which records a plurality of informative data of items, as an information file, to be used in classifying and arranging image data;
a microphone which inputs voices;
an inputting unit which orders instructions; and
a controller, based on instructions from said inputting unit, configured to decipher a content of expression made by said voices picked up through the microphone, configured to extract at least one of the plurality of the informative data of the items, analogous to the deciphered content of the expression from the information file, configured to associate the at least one of the plurality of the informative data of the items extracted by the extractor with the image data, and configured to record the associated at least one of the plurality of the informative data of the items,
wherein said inputting unit further comprises an item informative datum decisively determining unit which fixedly determines the at least one of the plurality of the informative data of the items extracted, and wherein said recorder records the at least one of the plurality of the informative data of the items decisively determined by the item information datum fixedly determining unit, and
wherein said inputting unit further comprises an item informative data selecting unit, and wherein when the plurality of the informative data of the items is extracted, the item informative datum selecting unit selects one of the plurality of the informative data of the items to be decisively determined by the item informative datum decisively determining unit.

9. The digital camera apparatus set forth in claim 8, wherein said item informative datum decisively determining unit comprises a release button of the digital camera apparatus, and the at least one of the plurality of the informative data of the items is decisively determined by pressing down the release button.

10. The digital camera apparatus set forth in claim 9, wherein said controller is further configured to effect on/off control of inputting of the voices with said microphone, and configured to control the on/off control of the inputting of the voices in conjunction with turning on/off operation of a specific key.

11. The digital camera apparatus set forth in claim 8, wherein said item informative datum selecting unit selects one of the plurality of the informative data of the items based on the content of the expression of the voices deciphered.

12. The digital camera apparatus set forth in claim 11, wherein said controller is further configured to effect on/off control of inputting of the voices with said microphone, and configured to control the on/off control of the inputting of the voices in conjunction with turning on/off operation of a specific key.

13. The digital camera apparatus set forth in claim 8, wherein said controller is further configured to effect on/off control of inputting of the voices with said microphone, and configured to control the on/off control of the inputting of the voices in conjunction with turning on/off operation of a specific key.

14. The digital camera apparatus according to claim 8, wherein the controller is configured to record the at least one of the plurality of the informative data of the items into an Exif file for the image data.

15. A method for controlling a digital camera apparatus, the method comprising:
inputting voices through a microphone;
converting the voices into voice data;
analyzing a content of expression of the voice data;
comparing the analyzed content of the expression of the voice data with a plurality of informative data of items, the plurality of the informative data of the items to be used in classifying and arranging image data and being stored in a recorder as an information file;
extracting at least one of the plurality of the informative data of the items analogous to the content of the expression from the information file according to the comparison;
selecting one of the plurality of the informative data of the items when the plurality of the informative data of the items is being extracted;
determining the at least one of the plurality of the informative data of the items extracted; and
recording the determined at least one of the plurality of the informative data of the items.

* * * * *